US012008889B2

(12) United States Patent
Deshpande et al.

(10) Patent No.: US 12,008,889 B2
(45) Date of Patent: Jun. 11, 2024

(54) METHOD AND SYSTEM TO IMPROVE EFFICIENCY OF SYSTEM TESTS FOR A SYSTEM HAVING A PLURALITY OF SENSORS

(71) Applicant: Honeywell International Inc., Charlotte, NC (US)

(72) Inventors: Surekha Deshpande, Bangalore (IN); Balamurugan Ganesan, Bengaluru (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/743,210

(22) Filed: May 12, 2022

(65) Prior Publication Data

US 2023/0368648 A1 Nov. 16, 2023

(51) Int. Cl.

*G08B 29/14* (2006.01)
*G08B 13/10* (2006.01)
*G08B 29/16* (2006.01)
*G08B 29/18* (2006.01)

(52) U.S. Cl.

CPC ............. *G08B 29/14* (2013.01); *G08B 13/10* (2013.01); *G08B 29/16* (2013.01); *G08B 29/185* (2013.01)

(58) Field of Classification Search

CPC .... G08B 29/145; G08B 29/14; G08B 29/185; G06F 11/321; G06F 11/3089; G06F 11/079; G06F 11/3065

See application file for complete search history.

(56) References Cited

U.S. PATENT DOCUMENTS

| | | | | |
|---|---|---|---|---|
| 9,659,485 | B2 | 5/2017 | Piccolo, III | |
| 9,972,187 | B1 | 5/2018 | Srinivasan et al. | |
| 10,522,031 | B2 | 12/2019 | Nalukurthy et al. | |
| 11,083,919 | B2 | 8/2021 | Meruva et al. | |
| 11,520,677 | B1 * | 12/2022 | Arazi | G16Y 20/20 |
| 2006/0125621 | A1 * | 6/2006 | Babich | G08B 29/14 340/531 |
| 2015/0113509 | A1 * | 4/2015 | Faraj | G06F 9/44526 717/124 |
| 2016/0027278 | A1 * | 1/2016 | Mcintosh | G08B 21/0423 715/741 |
| 2018/0061217 | A1 * | 3/2018 | Eichler | G08B 29/145 |

(Continued)

FOREIGN PATENT DOCUMENTS

GB 2466335 B 6/2011

OTHER PUBLICATIONS

Extended European Search Report, EP Application No. 23170396.8, European Patent Office, dated Oct. 9, 2023 (9 pages).

*Primary Examiner* — Mirza F Alam
(74) *Attorney, Agent, or Firm* — Seager, Tufte & Wickhem, LLP

(57) ABSTRACT

A sensor walk-test may be streamlined by storing an expected behavior of sensor events. The sensor event data is then compared to the expected behavior of sensor events in order to determine which of the plurality of sensors need a sensor walk-test to verify proper operation of the sensor and which of the plurality of sensors do not need a sensor walk-test. A listing of which of the plurality of sensors are determined to need a sensor walk-test to verify proper operation of the sensor is displayed on a display of a user device. Communication testing may be streamlined in a similar manner.

20 Claims, 9 Drawing Sheets

(56) References Cited

U.S. PATENT DOCUMENTS

| | | | |
|---|---|---|---|
| 2019/0086877 | A1 | 3/2019 | Norton et al. |
| 2020/0282564 | A1 | 9/2020 | Heintzelman et al. |
| 2021/0012242 | A1 | 1/2021 | Subbiah et al. |
| 2022/0082090 | A1 | 3/2022 | Kumar et al. |

* cited by examiner

METHOD AND SYSTEM TO IMPROVE EFFICIENCY OF SYSTEM TESTS FOR A SYSTEM HAVING A PLURALITY OF SENSORS

TECHNICAL FIELD

The present disclosure pertains generally to security systems and more particularly to improving the efficiency of security system tests.

BACKGROUND

A security system may include a number of security sensors within a monitored area. The monitored area may be indoors or outdoors, for example. Security sensors may include a variety of different types of sensors, including but not limited to door open sensors, window open sensors, motion sensors, glass break detectors, and the like. In many security systems, a walk test is performed in which each of a plurality of security sensors are periodically triggered to ensure their operation and performance. Performing such a walk test can be time consuming. Moreover, performing a walk test can require that the security system be placed in a test mode that can leave an otherwise protected facility subject to security issues. In many security systems, communication tests are periodically performed to ensure that the security sensors are also able to communicate with a security panel and/or that the security panel is able to communicate with one or more remote devices such as a central monitoring station and/or a cloud server. Such communication tests can be expensive as a result of the bandwidth necessary to perform the communication tests over time, particularly when the communication tests include communication over a cellular network or the like. A need remains for improved methods and systems for improving the efficiency of security system tests.

SUMMARY

This disclosure relates generally to method and systems to improve efficiency of security system tests. An example may be found in a method for streamlining a sensor walk-test of a system having a plurality of sensors operatively coupled to a controller. The illustrative method includes storing an expected behavior of sensor events of the system. Sensor event data received by the controller over a period of time is collected, where the sensor event data is representative of sensor events reported by the plurality of sensors during the period of time. The sensor event data is compared to the expected behavior of sensor events. Determining which of the plurality of sensors need a sensor walk-test to verify proper operation of the sensor and which of the plurality of sensors do not need a sensor walk-test is based at least in part on the comparison of the sensor event data collected during the period of time and the expected behavior of sensor events. A listing of which of the plurality of sensors are determined to need a sensor walk-test to verify proper operation of the sensor is displayed on a display of a user device.

Another example may be found in a method for streamlining communication testing of a communication path of a security system. The method includes scheduling execution of a plurality of communication tests in accordance with a test schedule to periodically verify communication of the communication path of the system. Operational communication along the communication path is monitored between scheduled communication tests. A timing for a next scheduled communication test is adjusted when the operational communication prior to the next scheduled communication test meets one or more communication criteria.

Another example may be found in a security system. The security system includes a plurality of sensors and a controller that is operably coupled to the plurality of sensors. The controller is configured to store an expected behavior of sensor events of the security system and to collect sensor event data received by the controller over a period of time, the sensor event data is representative of sensor events reported by the plurality of sensors during the period of time. In some cases, the period of time may be when the security system is in a disarm state. In other cases, the period of time may be when the security system is in an armed state. In yet other cases, the period of time may be when the security system in the armed state and/or in the disarm state and in the armed state.

The controller is configured to compare the sensor event data to the expected behavior of sensor events and to determine which of the plurality of sensors need a sensor walk-test to verify proper operation of the sensor and which of the plurality of sensors do not need a sensor walk-test based at least in part on the comparison of the sensor event data collected during the period of time and the expected behavior of sensor events. The controller is configured to report to a user device which of the plurality of sensors are determined to need a sensor walk-test to verify proper operation of the sensor.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
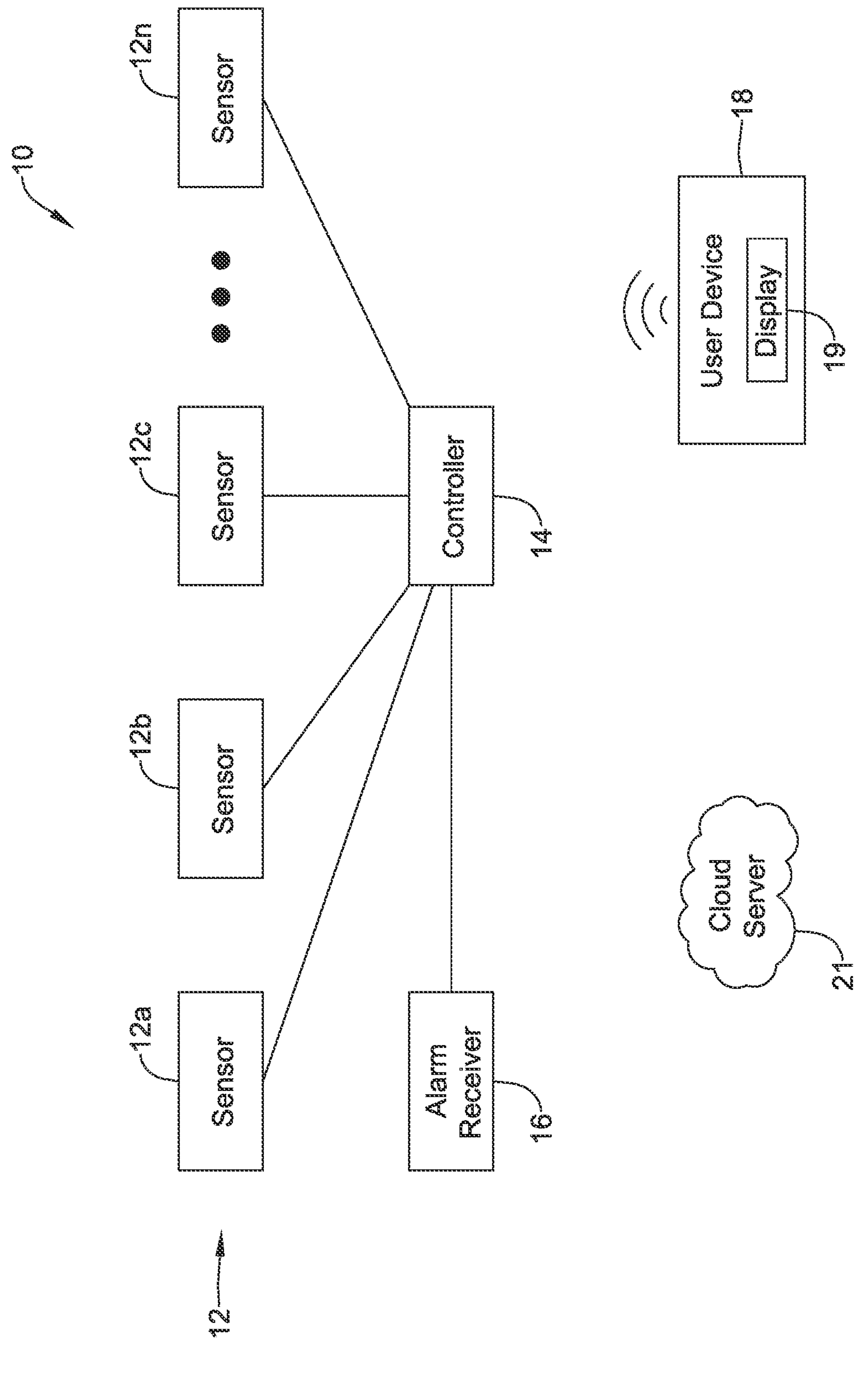
FIG. 1 is a schematic block diagram of an illustrative security system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative security system 10. The illustrative security system 10 includes a plurality of sensors 12, which are individually labeled as 12*a*, 12*b*, 12*c* and through 12*n*. The security system 10 may include any number of sensors 12. The security system 10 may include a variety of different types of sensors, such as but not limited to door open sensors, window open sensors, motion detectors and glass break detectors. The sensors 12 are operative coupled to a controller 14. The sensors 12 may communicate with the controller 14 over any desired communication protocol, including wired and wireless communication protocols. In some cases, the controller 14 may communicate alarms with an alarm receiver 16. In some cases, the controller 14 may communicate with a cloud-based server 21.

The controller 14 may be located in a facility in which the sensors 12 are located. In some cases, the controller 14 may be remote from the facility in which the sensors 12 are located. The controller 14 may be manifested within a computer server, for example. In some instances, the security system 10 may be considered as including a user device 18. The user device 18 may, for example, be a portable device such as a laptop computer, tablet, phablet or smartphone that the user may use to communicate with the controller 14, and thus display information provided by the controller 14 on a display 19 of the user device 18 as well as to allow the controller 14 to solicit information from the user, for example. The user device 18 may include a separate data entry mechanism (not shown). In some cases, the display 19 may be a touch screen display, which allows both display of information on the touch screen display as well as entering information via the touch screen display.

In some cases, the controller 14 may be configured to store an expected behavior of sensor events of the security system 10 and to collect sensor event data received by the controller 14 over a period of time. The sensor event data is representative of sensor events reported by the plurality of sensors 12 during the period of time. In some cases, the period of time may be when the security system is in a disarm state. In other cases, the period of time may be when the security system is in an armed state. In yet other cases, the period of time may be when the security system in the armed state and/or in the disarm state and in the armed state.

In some cases, the expected behavior of sensor events of a particular sensor may be, for example, at least a threshold minimum number of reported sensor events during the period of time. In some cases, the expected behavior of sensor events of a particular sensor may be, for example, at least a threshold minimum number of reported sensor events but less than a threshold maximum number of reported sensor events during the period of time. In some cases, the expected behavior of sensor events of a particular sensor may be, for example, a cluster of sensor events during a first sub-period of time (e.g. 7-9 AM) followed by another cluster of sensor events during a second sub-period of time (e.g. 4-5:30 PM) during the period of time. In some cases, the expected behavior of sensor events may be a combination of sensor events reported by two or more sensors. For example, the expected behavior of sensor events may include a sensor event reported by a first sensor, followed by a sensor event reported by a second sensor within 10 seconds of the sensor event reported by the first sensor. In some instances, the expected behavior of sensor events of the security system 10 may be learned over a training period of time using machine learning.

The controller 14 may be configured to compare the sensor event data to the expected behavior of sensor events and to determine which of the plurality of sensors 12 need a sensor walk-test to verify proper operation of the sensor 12 and which of the plurality of sensors 12 do not need a sensor walk-test based at least in part on the comparison of the sensor event data collected during the period of time and the expected behavior of sensor events. For example, if a particular sensor has not reported any sensor events during the period of time, it may be determined that a walk-test is need to verify the proper operation of the sensor. Likewise, if a second sensor is expected to generate a sensor event after a first sensor generates a sensor event, but the second sensor does not generate a sensor event after the first sensor generates a sensor event during the period of time, it may be determined that a walk-test is need to verify the proper operation of the second sensor. However, if the second sensor does generate a sensor event after the first sensor generates a sensor event each time during the period of time (even when the security system is in a disarm state), it may be determined that a walk-test is not needed to verify the proper operation of the second sensor. These are just examples. In some cases, the controller 14 may be configured to report to the user device 18 which of the plurality of sensors 12 are determined to need a sensor walk-test to verify proper operation of the sensor 12.

In some instances, the controller 14 may be configured to determine a confidence level in the determination of which of the plurality of sensors 12 need a sensor walk-test and/or which of the plurality of sensors 12 do not need a sensor walk-test based at least in part on a deviation of the sensor event data collected during the period of time and the expected behavior of sensor events. In some cases, the controller 14 may also be configured to report the confidence level to the user device 18 so that the user can see the confidence level.

Figure 2:
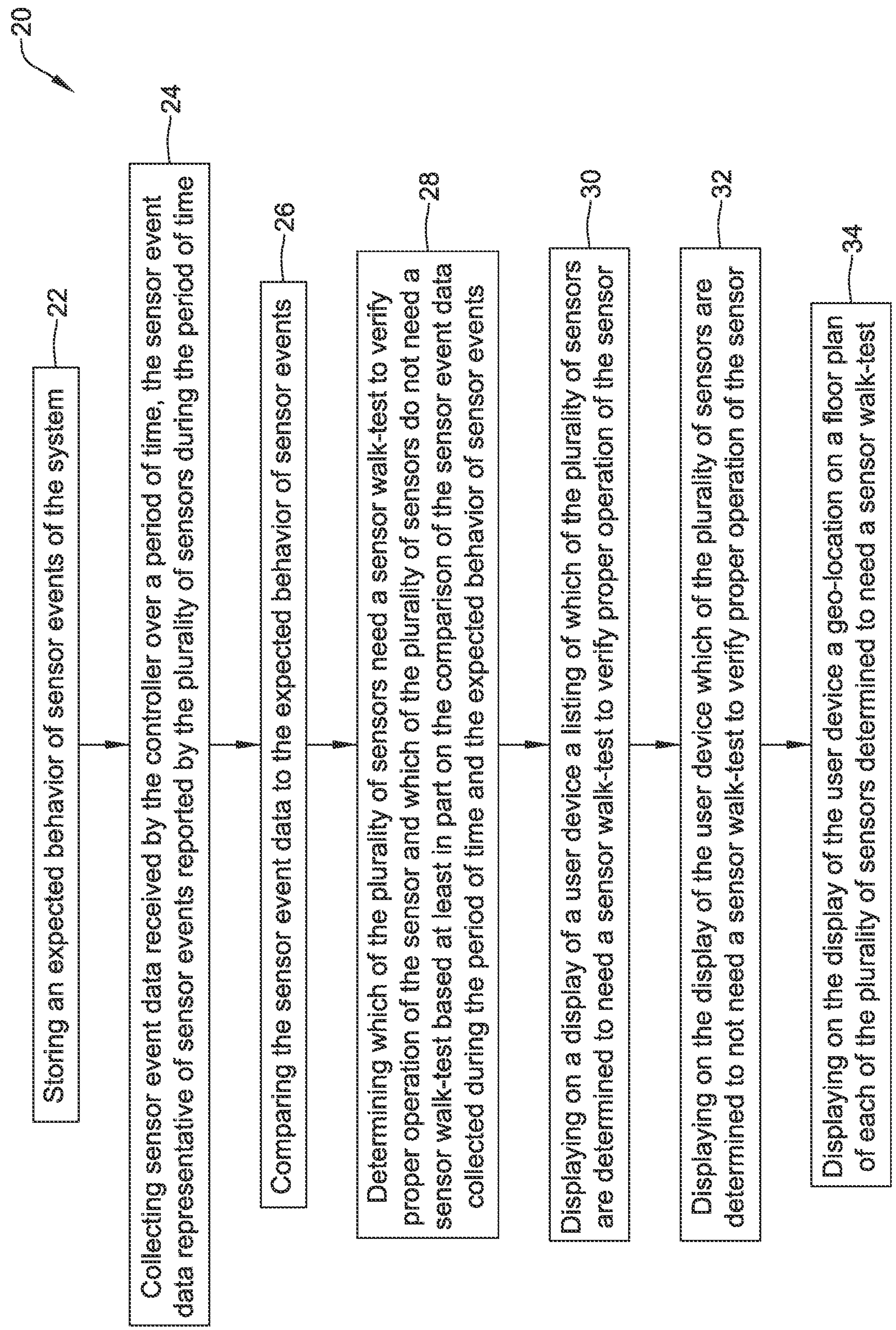
FIG. 2 is a flow diagram showing an illustrative method.

FIG. 2 is a flow diagram showing an illustrative method 20 for streamlining a sensor walk-test of a system (such as the security system 10) having a plurality of sensors (such as the plurality of sensors 12) operatively coupled to a controller (such as the controller 14). Rather than requiring a walk-test for every sensor of the system, it is contemplated that a walk-test may not be necessary for at least some of the sensors of the system, thereby streamlining the sensor walk-test of the system. The illustrative method 20 includes storing an expected behavior of sensor events of the system, as indicated at block 22. In some cases, the sensors events may include one or more trigger events that were sensed and reported by one or more of the plurality of sensors. The sensor events may additionally or alternatively include one or more sensed values that were sensed and reported by one or more of the plurality of sensors.

In some cases, the expected behavior of sensors events of the system may be learned over a training period of time using machine learning. In some instances, the expected behavior of sensor events for a particular one of the plurality of sensors may include receiving by the controller at least a threshold number of sensor events reported by the particular one of the plurality of sensors during the period of time. The expected behavior of sensor events for a particular one of the plurality of sensors may, for example, include receiving by the controller a temporal pattern of sensor events reported by the particular one of the plurality of sensors during the period of time. In some instances, the expected behavior of sensor events for a particular one of the plurality of sensors may include receiving by the controller one or more sensor events reported by the particular one of the plurality of sensors that are correlated with one or more sensor events reported by one or more other of the plurality of sensors during the period of time.

Sensor event data received by the controller is collected over a period of time. The sensor event data is representative of sensor events reported by the plurality of sensors during the period of time, as indicated at block 24. The sensor event data is compared to the expected behavior of sensor events, as indicated at block 26. A determination is made as to which of the plurality of sensors need a sensor walk-test to verify proper operation of the sensor and which of the plurality of sensors do not need a sensor walk-test based at least in part on the comparison of the sensor event data collected during the period of time and the expected behavior of sensor events, as indicated at block 28.

A listing of which of the plurality of sensors are determined to need a sensor walk-test to verify proper operation of the sensor is displayed on a display (such as the display 19) of the user device 18, as indicated at block 30. In some cases, the method 20 may also include displaying on the display of the user device which of the plurality of sensors are determined to not need a sensor walk-test to verify proper operation of the sensor, as indicated at block 34. The method 20 may also include displaying on the display of the user device a geo-location on a floor plan of each of the plurality of sensors determined to need a sensor walk-test, as indicated at block 34.

Figure 3A:
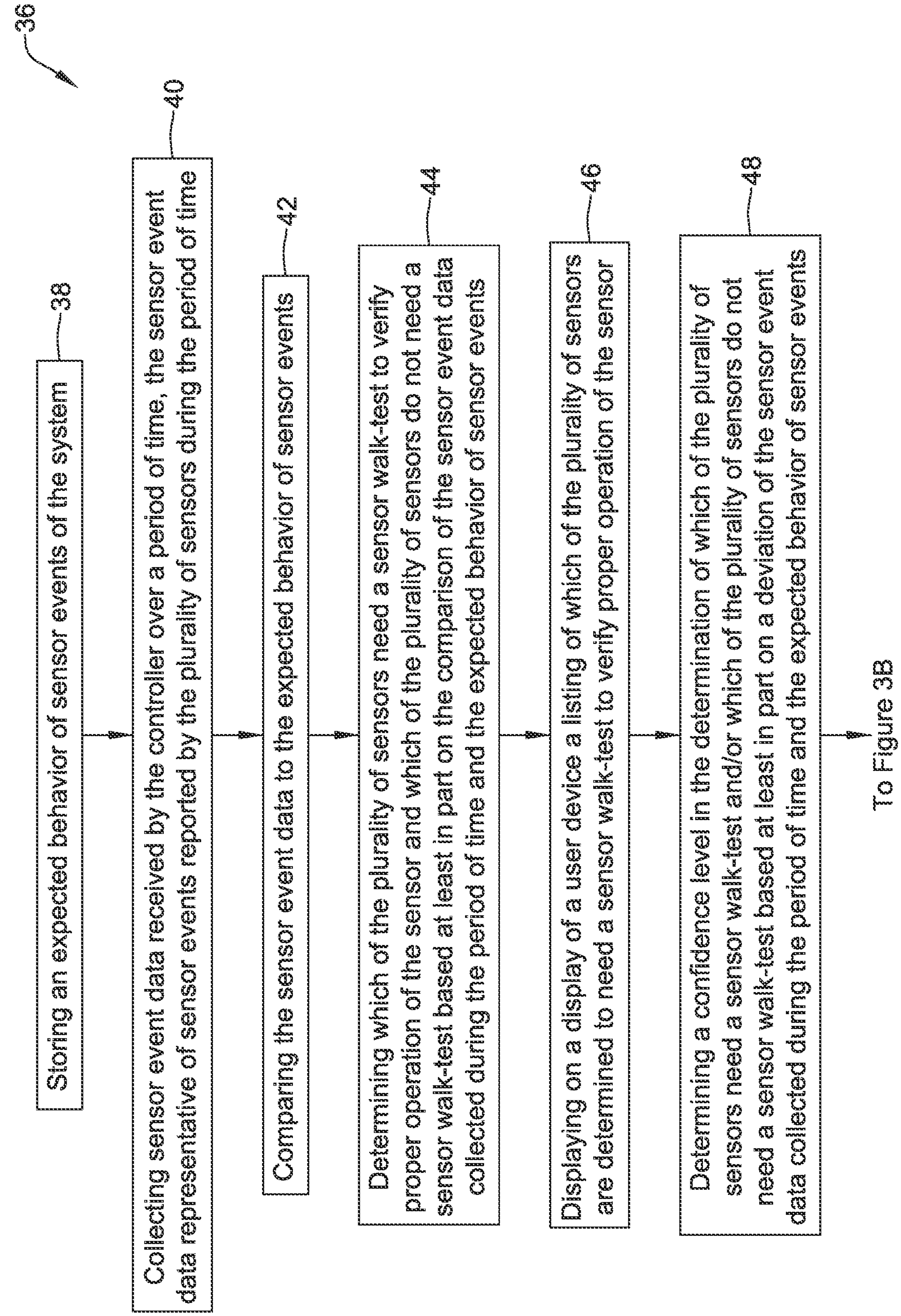
FIGS. 3A and 3B are flow diagrams that together show an illustrative method.
Figure 3B:
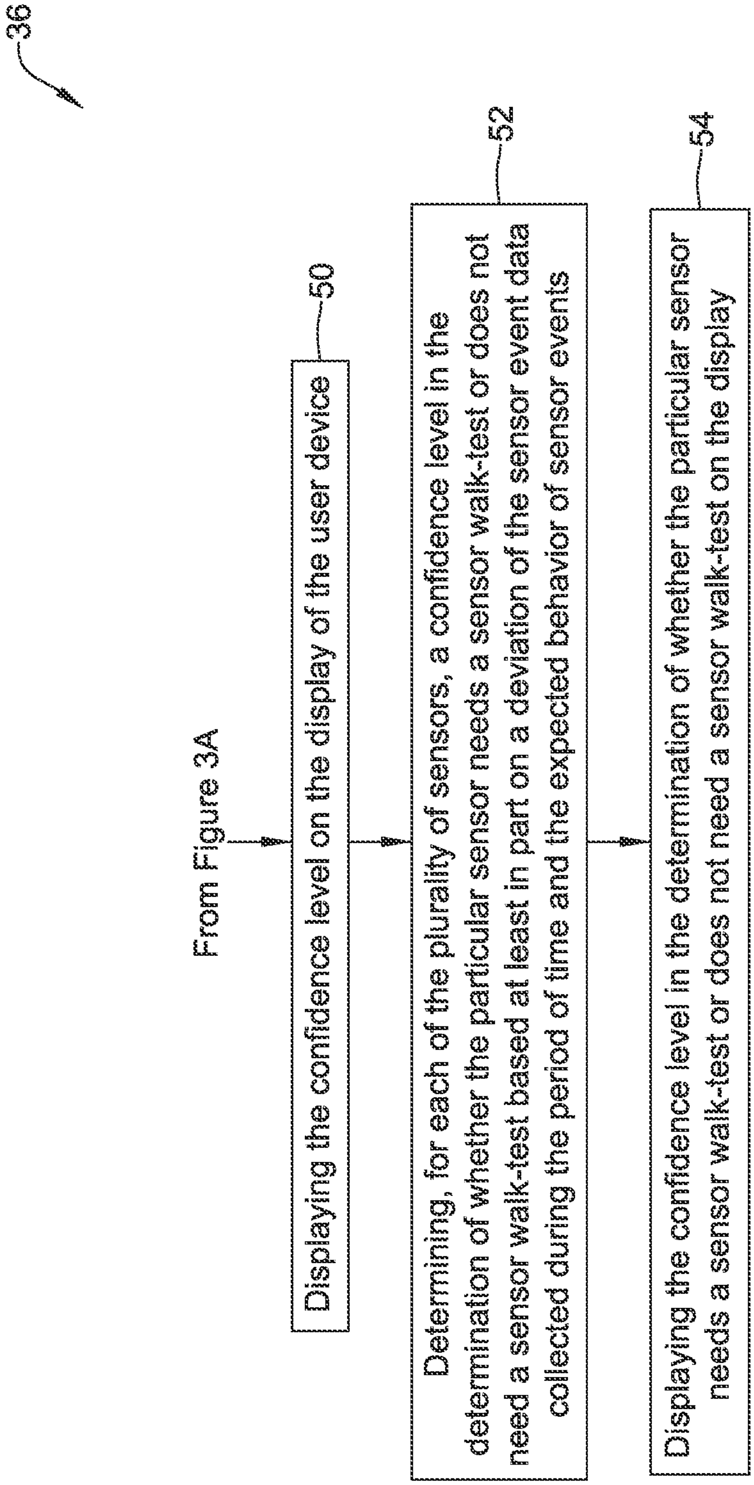

FIGS. 3A and 3B are flow diagrams that together show an illustrative method 36 for streamlining a sensor walk-test of a system (such as the security system 10) having a plurality of sensors (such as the plurality of sensors 12) operatively coupled to a controller (such as the controller 14). The illustrative method 36 includes storing an expected behavior of sensor events of the system, as indicated at block 38. In some cases, the sensors events may include one or more trigger events that were sensed and reported by one or more of the plurality of sensors. The sensor events may additionally or alternatively include one or more sensed values that were sensed and reported by one or more of the plurality of sensors.

In some cases, the expected behavior of sensors events of the system may be learned over a training period of time using machine learning. In some instances, the expected behavior of sensor events for a particular one of the plurality of sensors may include receiving by the controller at least a threshold number of sensor events reported by the particular one of the plurality of sensors during the period of time. The expected behavior of sensor events for a particular one of the plurality of sensors may, for example, include receiving by the controller a temporal pattern of sensor events reported by the particular one of the plurality of sensors during the period of time. In some instances, the expected behavior of sensor events for a particular one of the plurality of sensors may include receiving by the controller one or more sensor events reported by the particular one of the plurality of sensors that are correlated with one or more sensor events reported by one or more other of the plurality of sensors during the period of time.

Sensor event data received by the controller is collected over a period of time. The sensor event data is representative of sensor events reported by the plurality of sensors during the period of time, as indicated at block 40. The sensor event data is compared to the expected behavior of sensor events, as indicated at block 42. A determination is made as to which of the plurality of sensors need a sensor walk-test to verify proper operation of the sensor and which of the plurality of sensors do not need a sensor walk-test based at least in part on the comparison of the sensor event data collected during the period of time and the expected behavior of sensor events, as indicated at block 44. A listing of which of the plurality of sensors are determined to need a sensor walk-test to verify proper operation of the sensor is displayed on a display (such as the display 19) of the user device 18, as indicated at block 46.

The illustrative method 36 may include determining a confidence level in the determination of which of the plurality of sensors need a sensor walk-test and/or which of the plurality of sensors do not need a sensor walk-test based at least in part on a deviation of the sensor event data collected during the period of time and the expected behavior of sensor events, as indicated at block 48. Continuing with FIG. 3B, the method 36 may include displaying the confidence level on the display of the user device, as indicated at block 50. In some cases, the method 36 may further include determining, for each of the plurality of sensors, a confidence level in the determination of whether the particular sensor needs a sensor walk-test or does not need a sensor walk-test based at least in part on a deviation of the sensor event data collected during the period of time and the expected behavior of sensor events, as indicated at block 52. The confidence level in the determination of whether the particular sensor needs a sensor walk-test or does not need a sensor walk-test may be displayed on the display, as indicated at block 54.

Figure 4:
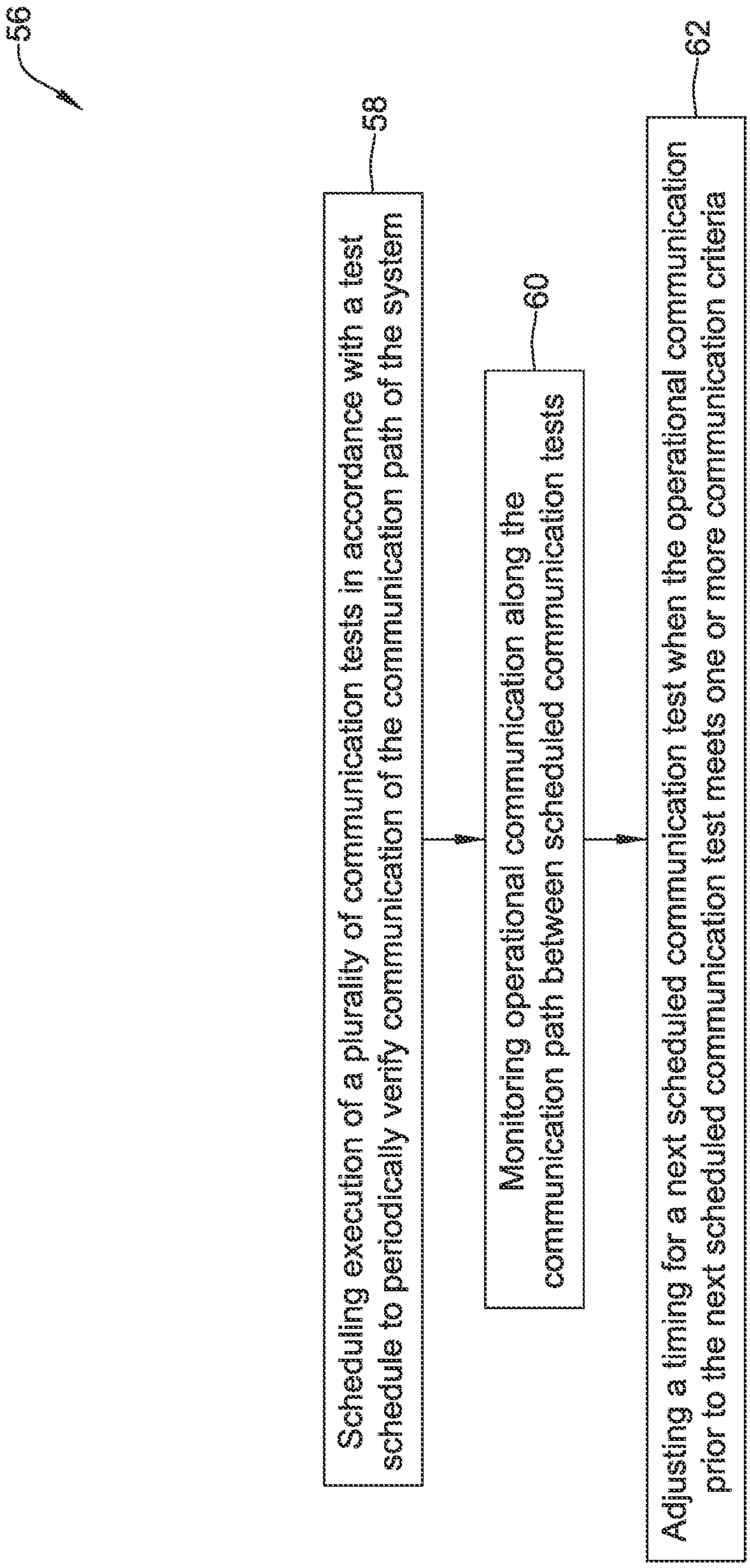
FIG. 4 is a flow diagram showing an illustrative method.

FIG. 4 is a flow diagram showing an illustrative method 56 for streamlining communication testing of a communication path of a system (such as the security system 10). The method 56 includes scheduling execution of a plurality of communication tests in accordance with a test schedule to periodically verify communication of the communication path of the system, as indicated at block 58. In some cases, the system includes a plurality of sensors that are operatively coupled to the controller via the alarm receiver, and the communication path is between the alarm receiver and the controller. In some cases, the system includes a plurality of sensors that are operatively coupled to the controller, with the controller operatively coupled to a cloud server, and the communication path is between the controller and the cloud server.

Operational communication along the communication path is monitored between scheduled communication tests, as indicated at block 60. Operational communication includes communication that occurs along the communication path(s) during normal system operation of the security system (e.g. while the security system is up and running in the facility, whether in an armed and/or disarmed state). A timing for a next scheduled communication test is adjusted when the operational communication prior to the next scheduled communication test meets one or more communication criteria, as indicated at block 62.

In some cases, the plurality of communication tests may include a plurality of scheduled ping-pong tests between the controller and the cloud server, wherein the scheduled ping-pong tests are scheduled to occur at scheduled frequency, and wherein adjusting the timing for the next scheduled communication test may include dynamically adjusting the scheduled frequency or test times depending on the number and/or frequency of communications that have occurred across that communication path during normal system operation of the security system. In some cases, adjusting the timing for a next scheduled communication test may include skipping the next scheduled communication test when the operational communication prior to the next scheduled communication meets the one or more communication criteria. As an example, the one or more communication criteria may include at least a threshold level of operational communication along the communication path over a predetermined period of time.

Figure 5:
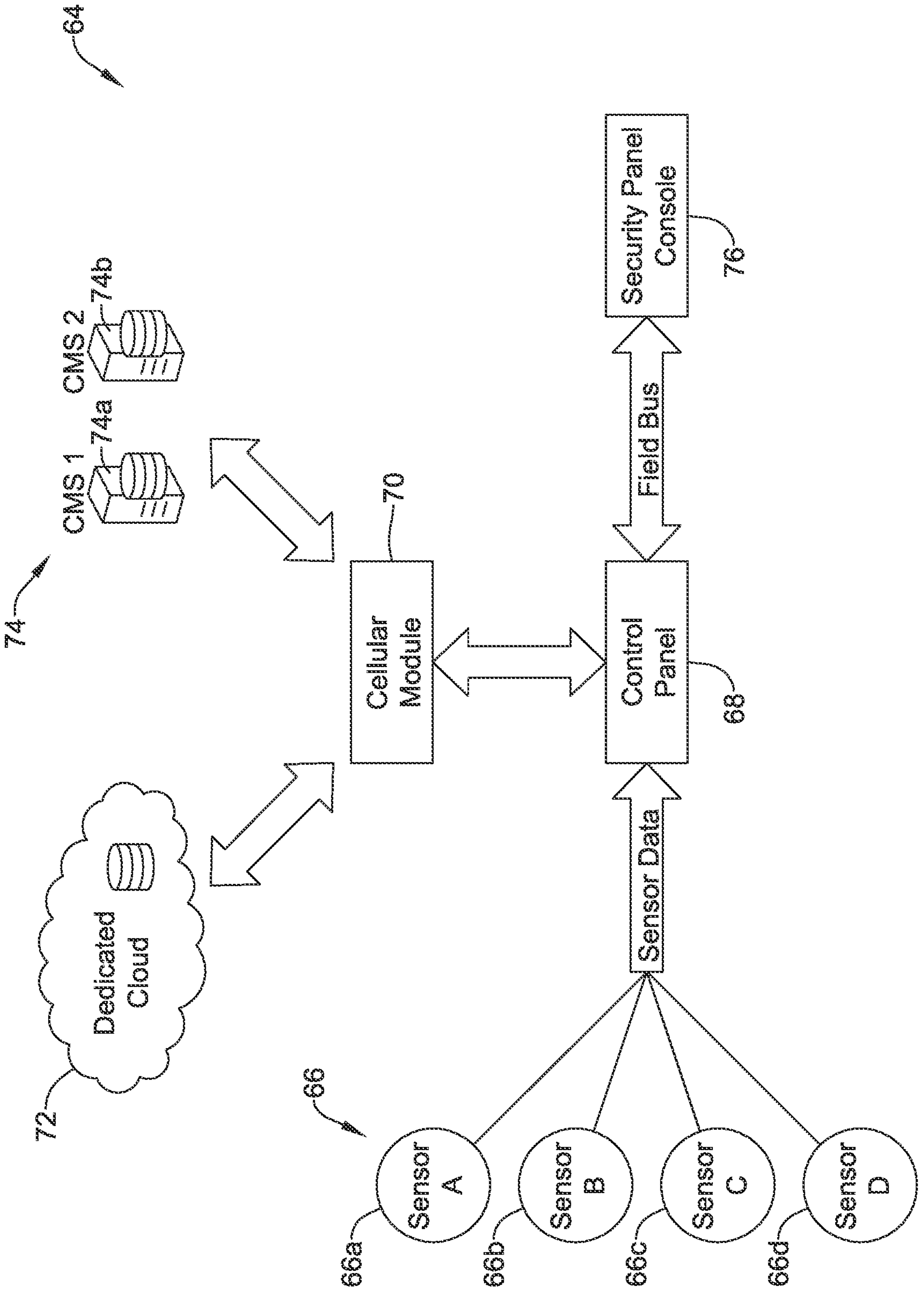
FIG. 5 is a schematic block diagram of an illustrative security system.

FIG. 5 is a schematic block diagram of an illustrative security system 64 that may be considered as being an example of the security system 10. Features ascribed to the security system 64 may be included in the security system 10. Features ascribed to the security system 10 may be included in the security system 64. The security system 64 includes a plurality of sensors 66, individually labeled as 66*a*, 66*b*, 66*c* and 66*d*. While a total of four sensors 66 are shown, it will be appreciated that this is merely illustrative, as the security system 64 may include any number of sensors 66. The security sensors 66 are operatively coupled with a control panel 68 such that sensor data is provided from the sensors 66 to the control panel 68. In some instances, the control panel 68 may be considered as an example of the controller 14.

The control panel 68 may include a cellular module 70 that allows the control panel 68 to communicate bidirectionally with a cloud-based server 72 and with any of a number of central monitoring stations (CMS) 74, individually labeled as 74*a* and 74*b*. In some cases, the control panel 68 may also be configured to communicate over a network with a security panel console 76. As an example, the control panel 68 and the security panel console 76 may communicate over a FieldBus network. The security panel console 76 may be considered as being an example of the user device 18.

Figure 6:
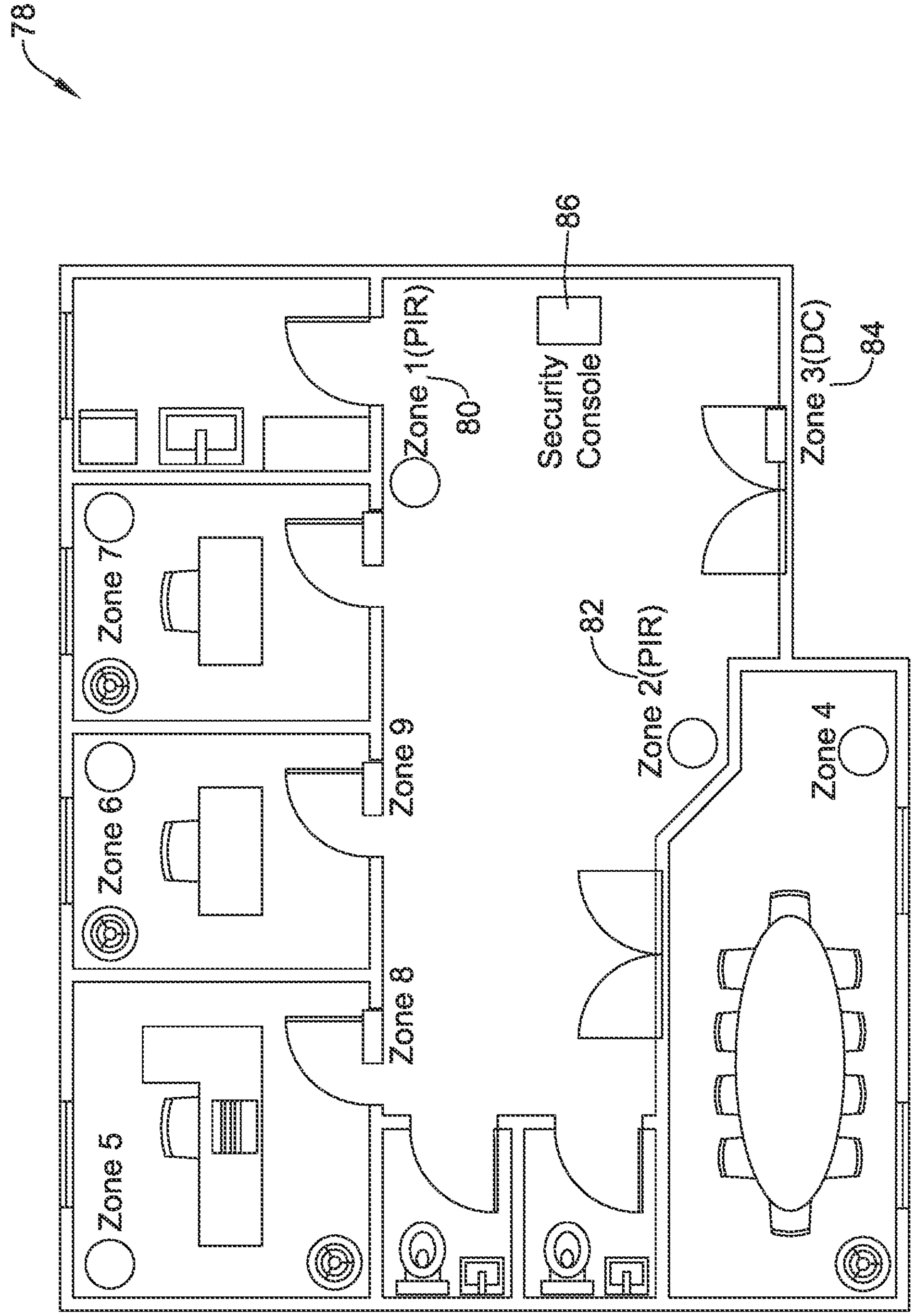
FIG. 6 is a schematic floor plan showing an example security system.

FIG. 6 is a schematic view of an illustrative floor plan 78. The floor plan 78 may be considered as representing part of an office space, with individual offices, a conference room, restrooms, a small kitchen and a lobby, for example. The floor plan 78 identifies each room or space as being part of a zone, labeled Zone 1 through Zone 10. Zone 1 includes a PIR (motion) sensor 80. Zone 2 includes a PIR sensor 82. Zone 3 includes a door close sensor 84. The floor plan 78 also shows a security console 86. The security console 86 may guide the user as to where the sensors are that need to be manually tested (e.g. need a walk-test), and may include a listing of the sensors that do not need to be manually tested (e.g. do not need a walk-test).

Figures 7A, 7B:
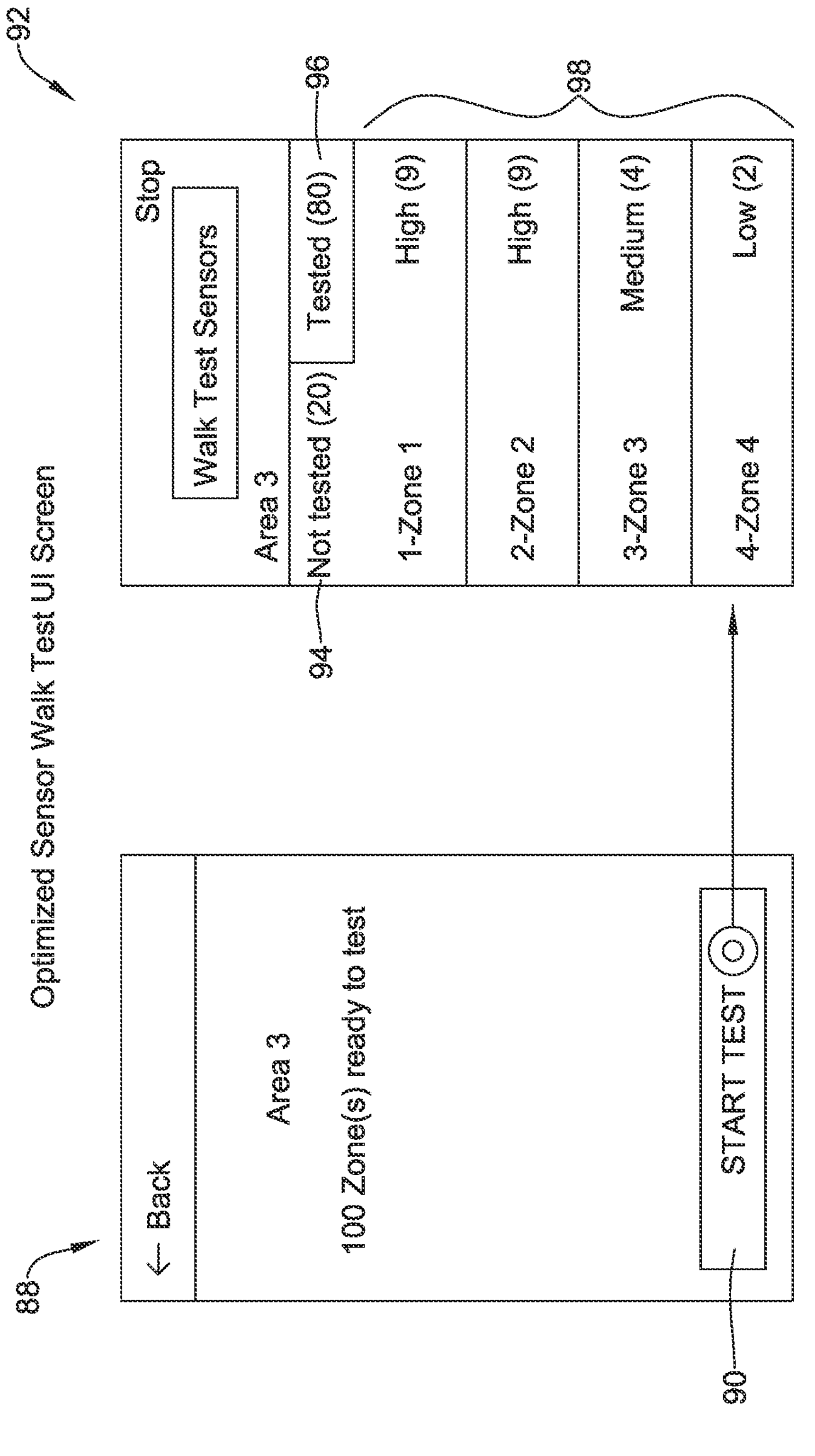
FIGS. 7A and 7B are screen shots showing illustrative screens that may be displayed.

FIGS. 7A and 7B are screen shots that may be displayed via the security console 86 in guiding the user through a walk test. In FIGS. 7A and 7B, the security console 86 is represented as a user's mobile device (e.g. smartphone). FIG. 7A shows a screen 88 that informs the user that Area 3, with a total of 100 zones, is ready to test. The screen 88 includes a START TEST button 90 that the user may select in order to start the walk-test.

FIG. 7B shows a screen 92 that may be displayed via the security console 86 once the user has selected the START TEST button 90. The screen 92 includes a NOT TESTED tab 94 and a TESTED tab 96. The sensors that are listed when the NOT TESTED tab 94 is selected include the sensors that need a walk-test. In FIG. 7B, the TESTED tab 96 has been selected. As a result, the screen 92 includes a listing 98 showing all of the sensors that have been automatically determined to not need a walk-test. The listing 98 includes an identification of each area or zone, along with a count on how many times the sensor(s) were determined to have been triggered, along with a confidence level in that determination (e.g. HIGH, MEDIUM, LOW). For example, in Zone 1, the system has determined that the sensor in Zone 1 was triggered nine (9) times during a prior period of time while the security system was under normal system operation, and the confidence level in the determination that the sensor does not need a sensor walk-test is HIGH. In another example, in Zone 4, that system has determined that the sensor was triggered only two (2) times during the prior period of time while the security system was under normal system operation, and the confidence level in the determination that the sensor does not need a sensor walk-test is LOW. In this latter case, and because of the LOW confidence level, a walk-test may or may not be conducted for the sensor(s) in Zone 4 at the discretion of the testing personnel.

Figure 8:
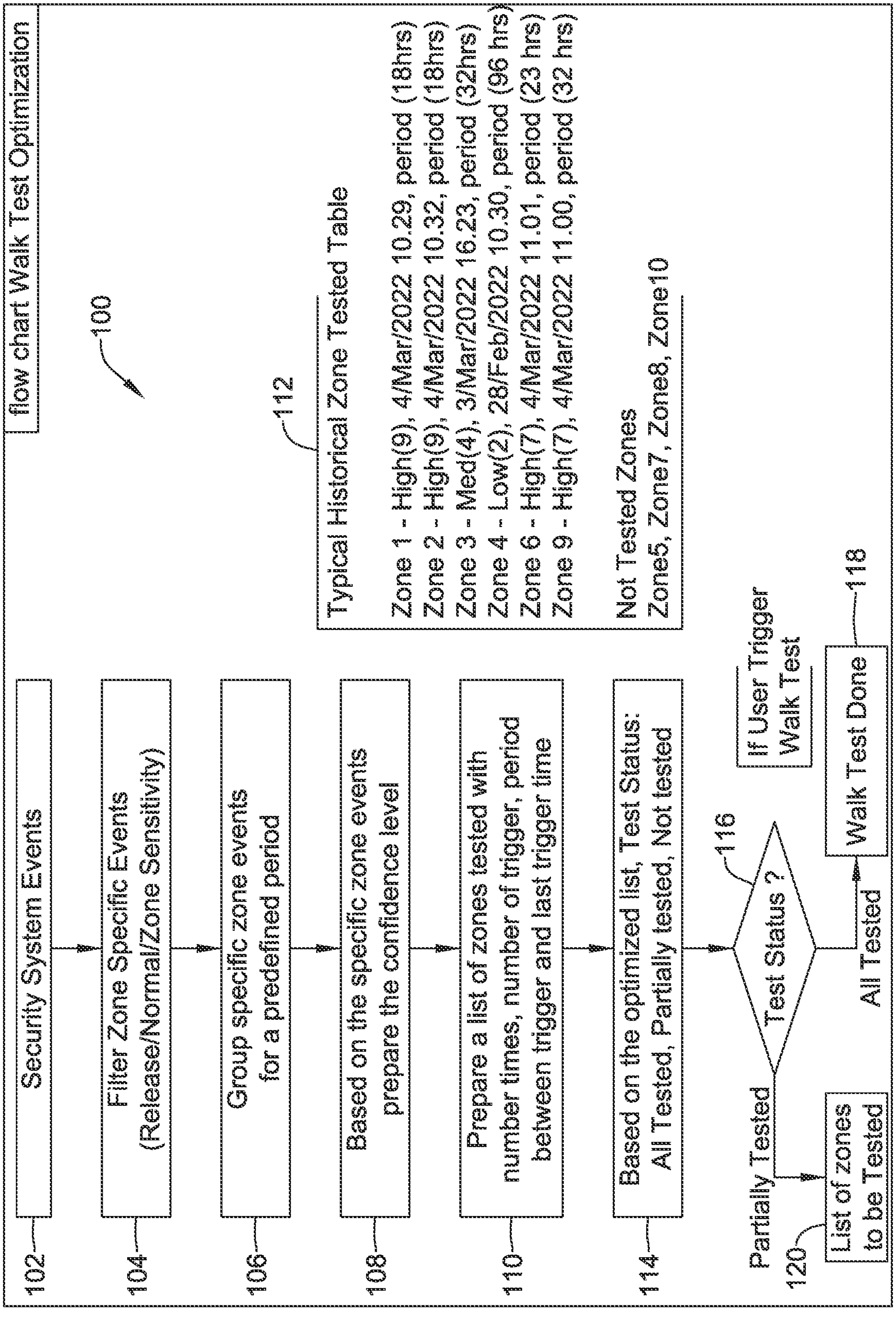
FIG. 8 is a flow diagram showing an illustrative method.

FIG. 8 is a flow diagram showing an illustrative method 100 for creating the historical tested zones map. The method 100 includes obtaining security system events, as indicated at block 102. The events are filtered to obtain zone-specific data, as indicated at block 104. Specific zones may be grouped together for a predefined time period, as indicated at block 106. Corresponding confidence levels may be determined, as indicated at block 108. A listing of zones tested may be prepared, as indicated at block 110. The listing of zones tested may include the determined confidence level, the number of triggers, the period between triggers, and the last trigger time. An example listing of zones is shown at 112. Test status may be determined, as indicated at block 114. The test status is queried at decision block 116. If all have been tested, control passes to block 118, and the walk test is done. If only some are tested, control passes to block 120, and a list of remaining sensors to be test is provided, as indicated at block 120.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed:

1. A method for streamlining a sensor walk-test of a system having a plurality of sensors operatively coupled to a controller, the method comprising:

storing an expected behavior of sensor events that is expected during normal system operation of the system;

collecting sensor event data received by the controller over a period of time, wherein the period of time occurs during normal system operation of the system and outside of any sensor walk-test of the system, the sensor event data representative of sensor events reported by the plurality of sensors during the period of time;

comparing the sensor event data to the expected behavior of sensor events;

determining which of the plurality of sensors need a sensor walk-test to verify proper operation of the sensor and which of the plurality of sensors do not need a sensor walk-test based at least in part on the comparison of the sensor event data collected during the period of time and the expected behavior of sensor events; and displaying on a display of a user device a listing of which of the plurality of sensors are determined to need a sensor walk-test to verify proper operation of the sensor.

2. The method of claim 1, further comprising displaying on the display of the user device which of the plurality of sensors are determined to not need a sensor walk-test to verify proper operation of the sensor.

3. The method of claim 1, wherein the expected behavior of sensor events of the system is learned over a training period of time using machine learning.

4. The method of claim 1, wherein the expected behavior of sensor events for a particular one of the plurality of sensors comprises receiving by the controller at least a threshold number of sensor events reported by the particular one of the plurality of sensors during the period of time.

5. The method of claim 1, wherein the expected behavior of sensor events for a particular one of the plurality of sensors comprises receiving by the controller a temporal pattern of sensor events reported by the particular one of the plurality of sensors during the period of time.

6. The method of claim 1, wherein the expected behavior of sensor events for a particular one of the plurality of sensors comprises receiving by the controller one or more sensor events reported by the particular one of the plurality of sensors that are correlated with one or more sensor events reported by one or more other of the plurality of sensors during the period of time.

7. The method of claim 1, further comprising:

determining a confidence level in the determination of which of the plurality of sensors need a sensor walk-test and/or which of the plurality of sensors do not need a sensor walk-test based at least in part on a deviation of the sensor event data collected during the period of time and the expected behavior of sensor events; and displaying the confidence level on the display of the user device.

8. The method of claim 7, further comprising:

determining, for each of the plurality of sensors, a confidence level in the determination of whether the particular sensor needs a sensor walk-test or does not need a sensor walk-test based at least in part on a deviation of the sensor event data collected during the period of time and the expected behavior of sensor events; and displaying the confidence level in the determination of whether the particular sensor needs a sensor walk-test or does not need a sensor walk-test on the display.

9. The method of claim 1, wherein the sensor events comprise one or more trigger events sensed and reported by one or more of the plurality of sensors.

10. The method of claim 1, wherein the sensor events comprise one or more sensed values sensed and reported by one or more of the plurality of sensors.

11. The method of claim 1, further comprising displaying on the display of the user device a geo-location on a floor plan of each of the plurality of sensors determined to need a sensor walk-test.

12. A method for streamlining testing of a system having a plurality of sensors and a communication path, the method comprising:

storing an expected behavior of sensor events that is expected during normal system operation of the system;

collecting sensor event data over a period of time, wherein the period of time occurs during normal system operation of the system and outside of any sensor walk-test of the system, the sensor event data representative of sensor events reported by the plurality of sensors during the period of time;

comparing the sensor event data to the expected behavior of sensor events;

determining which of the plurality of sensors need a sensor walk-test to verify proper operation of the sensor and which of the plurality of sensors do not need a sensor walk-test based at least in part on the comparison of the sensor event data collected during the period of time and the expected behavior of sensor events;

report to a user device which of the plurality of sensors are determined to need a sensor walk-test to verify proper operation of the sensor;

scheduling execution of a plurality of communication tests in accordance with a test schedule to periodically verify communication of the communication path of the system;

monitoring operational communication along the communication path during normal system operation of the system between the scheduled communication tests; and adjusting a timing for a next scheduled communication test when the operational communication prior to the next scheduled communication test meets one or more communication criteria.

13. The method of claim 12, wherein the plurality of sensors are operatively coupled to a controller via an alarm receiver, and the communication path is between the alarm receiver and the controller.

14. The method of claim 12, wherein the plurality of sensors are operatively coupled to a controller, with the controller operatively coupled to a cloud server, wherein the communication path is between the controller and the cloud server.

15. The method of claim 14, wherein the plurality of communication tests comprise a plurality of scheduled ping-pong tests between the controller and the cloud server, wherein the scheduled ping-pong tests are scheduled to occur at a scheduled frequency, and wherein adjusting the timing for the next scheduled communication test comprises dynamically adjusting the scheduled frequency.

16. The method of claim 12, wherein adjusting the timing for a next scheduled communication test comprises skipping the next scheduled communication test when the operational communication prior to the next scheduled communication meets one or more communication criteria.

17. The method of claim 12, wherein the one or more communication criteria comprise at least a threshold level of operational communication along the communication path over a predetermined period of time.

18. A security system comprising:

a plurality of sensors;

a controller operatively coupled to the plurality of sensors, the controller configured to:

store an expected behavior of sensor events that is expected during normal system operation of the security system;

collect sensor event data received by the controller over a period of time, wherein the period of time occurs during normal system operation of the security system while the security system is up and running in an armed state and/or a disarmed state, and wherein the period of time is outside of any sensor walk-test of the security system, the sensor event data representative of sensor events reported by the plurality of sensors during the period of time;

compare the sensor event data to the expected behavior of sensor events;

determine which of the plurality of sensors need a sensor walk-test to verify proper operation of the sensor and which of the plurality of sensors do not need a sensor walk-test based at least in part on the comparison of the sensor event data collected during the period of time and the expected behavior of sensor events; and report to a user device which of the plurality of sensors are determined to need a sensor walk-test to verify proper operation of the sensor.

19. The security system of claim 18, wherein the expected behavior of sensor events of the security system is learned over a training period of time using machine learning.

20. The security system of claim 18, wherein the controller is further configured to:

determine a confidence level in the determination of which of the plurality of sensors need a sensor walk-test and/or which of the plurality of sensors do not need a sensor walk-test based at least in part on a deviation of the sensor event data collected during the period of time and the expected behavior of sensor events; and report the confidence level to the user device.

* * * * *